United States Patent
Yang et al.

(10) Patent No.: US 10,292,182 B2
(45) Date of Patent: May 14, 2019

(54) LISTEN BEFORE TALK CHANNEL ACCESS PROCEDURE FOR UPLINK LAA

(71) Applicant: MEDIATEK INC., Hsinchu (TW)

(72) Inventors: Weidong Yang, San Diego, CA (US); Bo-Si Chen, Keelung (TW); Chien-Chang Li, Penghu County (TW); Yih-Shen Chen, Hsinchu County (TW); Pavan Santhana Krishna Nuggehalli, Mountain View, CA (US)

(73) Assignee: HFI Innovation INC., Hsin-Chu (TW)

( * ) Notice: Subject to any disclaimer, the term of this patent is extended or adjusted under 35 U.S.C. 154(b) by 0 days.

(21) Appl. No.: 15/432,022

(22) Filed: Feb. 14, 2017

(65) Prior Publication Data

US 2017/0238334 A1    Aug. 17, 2017

Related U.S. Application Data

(60) Provisional application No. 62/295,589, filed on Feb. 16, 2016.

(51) Int. Cl.
*H04W 72/12* (2009.01)
*H04W 74/08* (2009.01)
*H04W 74/00* (2009.01)

(52) U.S. Cl.
CPC ... *H04W 74/0816* (2013.01); *H04W 74/0808* (2013.01); *H04W 74/006* (2013.01)

(58) Field of Classification Search
CPC ......... H04W 72/1268; H04W 72/1289; H04W 74/0816
See application file for complete search history.

(56) References Cited

U.S. PATENT DOCUMENTS

| | | | |
|---|---|---|---|
| 2011/0261747 A1 | 10/2011 | Wang et al. | 370/315 |
| 2012/0044805 A1 | 2/2012 | Lee et al. | 370/230 |

(Continued)

FOREIGN PATENT DOCUMENTS

| | | |
|---|---|---|
| CN | 104717687 A | 4/2015 |
| CN | 104812032 A | 4/2015 |

(Continued)

OTHER PUBLICATIONS

International Search Report and Written Opinion of International Search Authority for PCT/CN2017/073755 dated May 17, 2017 (11 pages).

(Continued)

*Primary Examiner* — Ronald B Abelson
(74) *Attorney, Agent, or Firm* — Imperium Patent Works; Zheng Jin

(57) ABSTRACT

A method of dynamic spectrum sharing mechanism called listen-before-talk (LBT) is proposed for uplink transmission in Licensed Assisted Access (LAA). A maximum channel occupancy time (MCOT) including downlink (DL) transmission from one eNB and uplink (UL) transmission to the same eNB is introduced. A transmission sequence is defined as a number of subframes including possible partial subframes for DL and/or UL within a MCOT. The transmission in the first subframe among the transmission sequence is conducted after a Category 4 LBT. The transmission sequence within the MCOT can be initiated by either a DL transmission or an UL transmission. After the first subframe in a transmission sequence, LBT for another transmission is a fast DL LBT and/or fast UL LBT. Further, a Category 4 LBT can be converted to a short LBT (e.g., one shot CCA) for more efficient channel access.

14 Claims, 5 Drawing Sheets

CATEGORY 4 LBT/FAST LBT
AND LBT CONVERSION

(56) References Cited

U.S. PATENT DOCUMENTS

| | | | |
|---|---|---|---|
| 2014/0204800 A1 | 7/2014 | Moulsley | 370/254 |
| 2015/0071220 A1 | 3/2015 | Luo et al. | 370/329 |
| 2015/0085797 A1 | 3/2015 | Ji et al. | 370/329 |
| 2015/0092703 A1 | 4/2015 | Xu et al. | 370/329 |
| 2015/0092758 A1 | 4/2015 | Chen et al. | 370/336 |
| 2015/0103715 A1 | 4/2015 | Chen et al. | 370/311 |
| 2015/0131578 A1 | 5/2015 | Baek et al. | 370/329 |
| 2015/0148046 A1 | 5/2015 | Lim et al. | 455/444 |
| 2016/0081010 A1 | 3/2016 | Seok | 370/329 |
| 2017/0094485 A1 | 3/2017 | Saxena et al. | 455/414.1 |
| 2017/0238233 A1 | 8/2017 | Oh et al. | 370/328 |
| 2018/0352573 A1* | 12/2018 | Yang | H04W 74/08 |

FOREIGN PATENT DOCUMENTS

| | | |
|---|---|---|
| CN | 105101446 A | 6/2015 |
| CN | 104994591 A | 7/2015 |
| WO | WO2014178678 A1 | 5/2013 |

OTHER PUBLICATIONS

ETSI EN 301 893 V1.8.1 Broadband Radio Access Networks (BRAN); 5 GHz high performance RLAN; Harmonized EN covering the essential requirements of article 3.2 of the R&TTE Directive; Mar. 31, 2015.

International Search Report and Written Opinion of International Search Authority for PCT/CN2017/073795 dated May 4, 2017 (11 pages).
USPTO, notice of allowance for related U.S. Appl. No. 15/433,492 dated Apr. 10, 2018 (14 pages).
Taiwan IPO, office action for the TW patent application 106105022 (non English translation is available) dated Aug. 14, 2018 (4 pages).
R1-156386 3GPP TSG RAN WG1 Meeting #82bis, WI rapporteur (Ericsson, Huawei), "RAN1 Agreements and Working Assumptions for Rel-13 LAA (Revision of R1-156379)", Malmö, Sweden, Oct. 5-9, 2015 (9 pages).
R1-152649 3GPP TSG RAN WG1 Meeting #81, Intel Corp., "On the LAA UL:LBT, scheduling, and sub-frame structure", Fukuoka, Japan, May 25-29, 2015 (3 pages).
R1-156768 3GPP TSG RAN WG1 Meeting #83, Samsung, "Discussion on LBT for UL transmission", Anaheim, USA, Nov. 15-22, 2015 (6 pages).
EPO, search report for the EP patent application 17752681.1 dated Jan. 16, 2019 (10 pages).
R1-160890 3GPP TSG RAN WG1 Meeting #84, Qualcomm Incorporated, "UL Channel Access", St. Julian's, Malta, Feb. 15-19, 2016 (3 pages).
R1-161000 3GPP TSG RAN WG1 Meeting #84, Ericsson, "On Coordinated UL Channel Access for Enhances LAA", St. Julian's, Malta, Feb. 15-19, 2016 (3 pages).
R1-160674 3GPP TSG RAN WG1 Meeting #84, Sony Corporation, UL Channel access mechanism design in eLAA:, St. Julian's, Malta, Feb. 15-19. 2016 (3 pages).

* cited by examiner

CONVERSION OF UL LBT

START TIME FOR UL LBT

LISTEN BEFORE TALK CHANNEL ACCESS PROCEDURE FOR UPLINK LAA

CROSS REFERENCE TO RELATED APPLICATIONS

This application claims priority under 35 U.S.C. § 119 from U.S. Provisional Application No. 62/295,589 entitled, "Channel Access Procedure for Uplink LAA," filed on Feb. 16, 2016, the subject matter of which is incorporated herein by reference.

TECHNICAL FIELD

The disclosed embodiments relate generally to wireless communication, and, more particularly, to Listen Before Talk (LBT) channel access procedure for uplink licensed assisted access (LAA).

BACKGROUND

At licensed spectrum, there is only one owner of that spectrum in an area, which facilitates to create a single depot of information for base stations (eNBs). For example, eNBs under one operator can exchange channel state information and scheduling information. With single cell scheduling, radio resource access is typically controlled by eNB in an LTE system. In Coordinated Multipoint Operation (CoMP) and eCoMP, centralized or distributed scheduling can be used to coordinate the transmissions from eNBs with a direct goal to achieve either higher SINRs or interference mitigation. A salient point about (e)CoMP is identified as information exchange is through a network link which is either proprietary or standard based (e.g. X2). Typically, the exchanged information carried over those links need to happen with latency up to tens of milliseconds. In summary, interference handling is a central issue in wireless communications and the sole ownership of licensed spectrum has enabled information exchange among eNBs under one operator to achieve effective interference handling.

Third generation partnership project (3GPP) and Long Term Evolution (LTE) mobile telecommunication systems provide high data rate, lower latency and improved system performances. With the rapid development of "Internet of Things" (IOT) and other new user equipment (UE), the demand for supporting machine communications increase exponentially. To meet the demand of this exponential increase in communications, additional spectrum (i.e. radio frequency spectrum) is needed. The amount of licensed spectrum is limited. Therefore, communications providers need to look to unlicensed spectrum to meet the exponential increase in communication demand. One suggested solution is to use a combination of licensed spectrum and unlicensed spectrum. This solution is referred to as "Licensed Assisted Access" or "LAA".

In LAA, an established communication protocol such as LTE can be used over the licensed spectrum to provide a first communication link, and LTE can also be used over the unlicensed spectrum to provide a second communication link. Furthermore, while LAA only utilizes the unlicensed spectrum to boost downlink through a process of carrier aggregation, enhanced LAA (eLAA) allows uplink streams to take advantage of the unlicensed bands as well. The unlicensed band could be ISM band (Industrial Scientific Medical Band) at 2.4 GHz or 5 GHz, or it could be CBRS band (Citizens Broadband Radio Service band) at 3.5 GHz as long as no spectrum auction procedure takes place.

Although eLAA is straight forward in theory, practical usage of eLAA while complying with various government regulations regarding the usage of unlicensed spectrum is not so straightforward. As no entity, network operator or otherwise, has a monopoly of using a certain frequency spectrum in an area, there can be wireless communication equipments outside the control of an operator which interfere with that operator's equipments. Furthermore, there is no single depot where information about channel states and traffic converge. As a result, the interference handling schemes developed at licensed spectrum such as (e)CoMP, (e)ICIC, etc. may no longer work at unlicensed spectrum. Hence, there is a need to coordinate the transmissions from equipments made by different eNB vendors, or allow collaboration among equipments made by different eNB vendors.

Listen-before-talk (LBT) schemes are discussed for solving the issue caused from the coexistence between WiFi and Licensed Assisted Access (LAA) and between LAA and LAA. To facilitate efficient and fair spectrum sharing, the dynamic spectrum sharing mechanism LBT need to be supported for both downlink LAA and uplink LAA based on regulation rules in each country. When more than one UEs contend uplink transmission for a given time slot in unlicensed band, a solution for efficient uplink channel access procedure based on LBT is sought.

SUMMARY

A method of dynamic spectrum sharing mechanism called listen-before-talk (LBT) is proposed for uplink transmission in Licensed Assisted Access (LAA). In accordance with one novel aspect, a maximum channel occupancy time (MCOT) including downlink (DL) transmission from one eNB and uplink (UL) transmission to the same eNB is introduced. A transmission sequence is defined as a number of subframes including possible partial subframes for DL and/or UL within a MCOT. The transmission in the first subframe among the transmission sequence is conducted after a Category 4 LBT. The transmission sequence within the MCOT can be initiated by either a DL transmission or an UL transmission. After the first subframe in a transmission sequence, LBT for another transmission is a fast DL LBT and/or fast UL LBT. Further, a Category 4 LBT can be converted to a short LBT (e.g., one shot CCA) for more efficient channel access.

In one embodiment, a wireless device performs a first listen-before-talk (LBT) channel access procedure to contend for a wireless channel and initiate a transmission sequence starting with a first subframe. The wireless device receives scheduling information from a base station for uplink transmission of a second subsequent subframe. The wireless device performs a second LBT channel access procedure for the second subframe if the second subframe belongs to the same transmission sequence. The wireless device performs a first LBT channel access procedure if the second subframe does not belong to the same transmission sequence and if a fast channel access condition is not satisfied.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
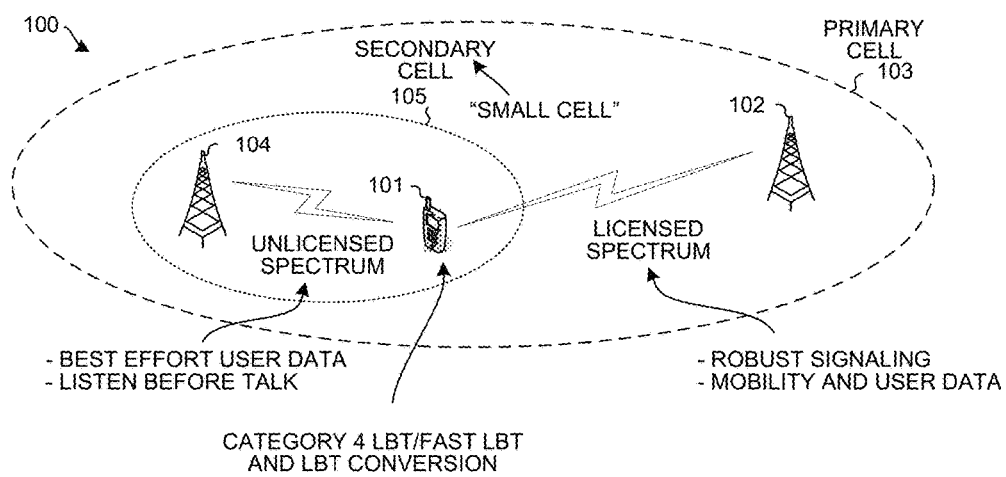
FIG. 1 illustrates an exemplary Licensed Assisted Access (LAA) wireless network that adopts listen before talk (LBT) channel access mechanism in accordance with embodiments of the current invention.

FIG. 1 illustrates an exemplary Licensed Assisted Access (LAA) wireless communications system 100 that adopts listen before talk (LBT) channel access mechanism in accordance with embodiments of the current invention. Wireless communications system 100 includes one or more wireless communication networks, and each of the wireless communication networks has base infrastructure units, such as 102 and 104. The base units may also be referred to as an access point, an access terminal, a base station, eNB, or by other terminology used in the art. Each of the base stations 102 and 104 serves a geographic area. The geographic area served by wireless communications stations 102 and 104 overlaps in this example.

Base station 102 is a licensed base station that communicates with UE 101 via a licensed frequency band. In one example, base station 102 communicates with UE 101 via Long-Term Evolution (LTE) wireless communication. Base station 102 provides wireless communication to multiple UEs within primary cell 103. Base station 104 is an unlicensed base station that communicates with UE 101 via an unlicensed frequency band. In one example, base station 104 communicates with UE 101 via LTE wireless communication. Base station 104 can communicate with multiple UEs with a secondary cell 105. Secondary cell 105 is also referred to as a "small cell".

The exponential growth in data consumption has created large bandwidth demands that cannot be met by current wireless systems. To meet this ever-increasing demand for data, new wireless systems with greater available bandwidth are needed. Licensed Assisted Access (LAA) wireless networks can be used to provide greater available bandwidth. A LAA network utilizes unlicensed frequency bands in addition to licensed frequency bands contemporaneously, thereby provided additional available bandwidth to the UEs in the wireless system. For example, UE 101 can benefit from simultaneous use of the licensed frequency band and the unlicensed frequency band in a LAA network. The LAA network not only provides additional bandwidth for greater overall data communication, but also provide consistent data connectivity due to the presence of two separate data links. Having multiple data links available increases the probability that the UE will be able to achieve proper data communication with at least one base station at any given moment. While utilization of the unlicensed spectrum provides more available bandwidth, the use of the unlicensed spectrum faces practical problems that need to be addressed.

To facilitate efficient and fair spectrum sharing, a dynamic spectrum sharing mechanism called listen-before-talk (LBT) is supported based on regulation rules in each country. However, the performance of LAA with LBT mechanism may not satisfy the purpose of efficient and fair spectrum sharing. In accordance with one novel aspect, a maximum channel occupancy time (MCOT) including DL transmission from one eNB and UL transmission to the same eNB is introduced. A transmission sequence is defined as a number of subframes including possible partial subframes for DL and/or UL within a MCOT. The transmission in the first subframe among the transmission sequence, which can be over a partial subframe, is conducted after a Category 4 LBT. The node performing the Category 4 LBT can be either an eNB or a UE. A sequence of transmission including DL and/or UL can follow the transmission on the first subframe. The transmission sequence within the MCOT can be initiated by either a DL transmission or an UL transmission. The duration of a transmission sequence is called transmission duration. After the first subframe in a transmission sequence, LBT for another transmission should be faster compared to the Category 4 LBT, e.g., fast DL LBT and/or fast UL LBT. Further, a Category 4 LBT can be converted to a short LBT (e.g., one shot CCA) for more efficient channel access.

Figure 2:
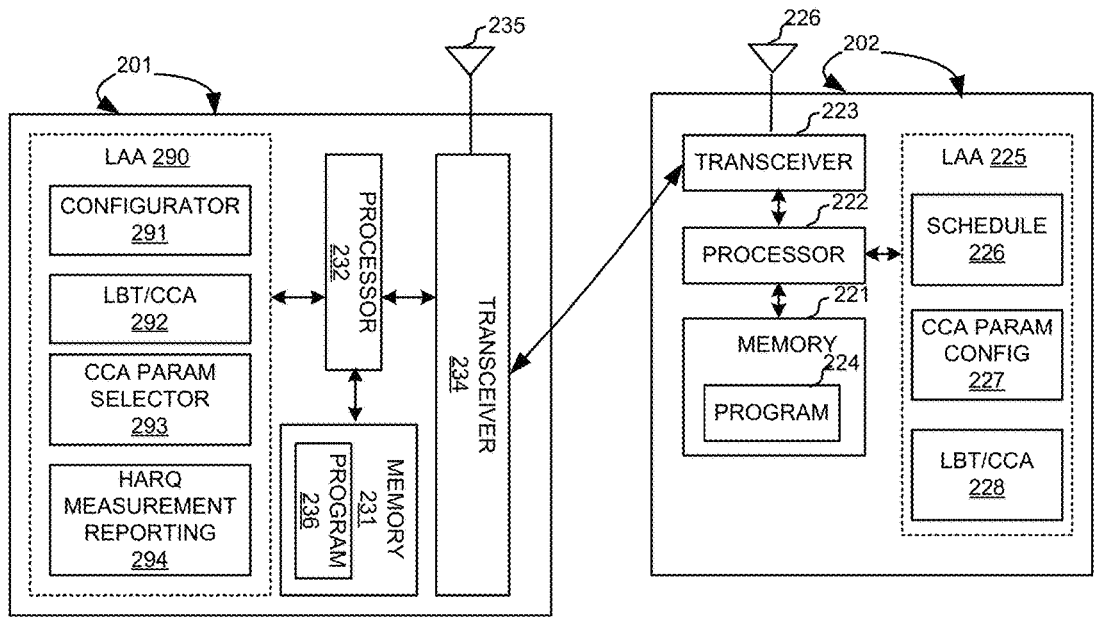
FIG. 2 illustrates an exemplary block diagram of a User Equipment (UE) and a base station (eNB) in accordance with embodiments of the current invention.

FIG. 2 illustrates the various components included in a UE 201 and a base station 202. Base station 202 may have an antenna array 226 with one or more antennas, which transmit and receive radio signals. An RF transceiver module 223, coupled with the antenna, receives RF signals from antenna array 226, converts them to baseband signals and sends them to processor 222. RF transceiver 223 also converts received baseband signals from processor 222, converts them to RF signals, and sends out to antenna array 226. Processor 222 processes the received baseband signals and invokes different functional modules to perform features in base station 202. Memory 221 stores program instructions and data 224 to control the operations of base station 202. Base station 202 also includes a set of control modules and circuits—LAA controller 225 that carries out functional tasks to configure, schedule, execute and communicate with the UE 201 for LAA tasks such as described in detail below. In one example, LAA controller 225 includes a scheduler 226 that schedules downlink and uplink transmission for the UEs including UE 201, a CCA parameter configurator 227 that determines CCA parameters for each traffic type, and a LBT/CCA channel access handler 228 that ensures BS 202 only transmits radio signals over the shared medium when the channel is idle or when it wins the channel contention via LBT/CCA channel access procedure.

User equipment UE 201 has an antenna array 235 with one or more antennas, which transmit and receive radio signals. An RF transceiver module 234, coupled with the antenna, receives RF signals from antenna array 235, converts them to baseband signals and sends them to processor 232. RF transceiver 234 also converts received baseband signals from processor 232, converts them to RF signals, and sends out to antenna 235. Processor 232 processes the received baseband signals and invokes different functional modules to perform features in UE 201. Memory 231 stores program instructions and data 236 to control the operations of UE 201.

UE 201 also includes a set of control modules and circuits including LLA controller 290 that carry out functional tasks. The control modules and circuits can be implemented and configured by hardware, firmware, software, and a combination thereof. Configurator 291 obtains various configuration and parameters from the network for LBT/CCA operation. LBT/CCA channel access handler 292 ensures that UE 201 does not transmit signals when another unlicensed frequency band eNB/UE is transmitting. CCA parameter selector 293 determines CCA parameters for each traffic type. Measurement and reporting circuit 294 performs Hybrid Automatic Repeat Request (HARQ) and CSI/RRM measurements and reports the HARQ feedback and measurement results to its serving base station.

There are four different categories of channel access schemes for accessing a shared wireless medium. Category 1 (No LBT) means no LBT procedure is performed by the transmitting entity. Category 2 (LBT without random backoff) means the duration of time that the channel is sensed to be idle before the transmitting entity transmits is deterministic. For Category 3 (LBT with random backoff with a contention window of fixed size), the transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel. For Category 4 (LBT with random backoff with a contention window of variable size), the transmitting entity draws a random number N within a contention window. The size of the contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

Figure 3:
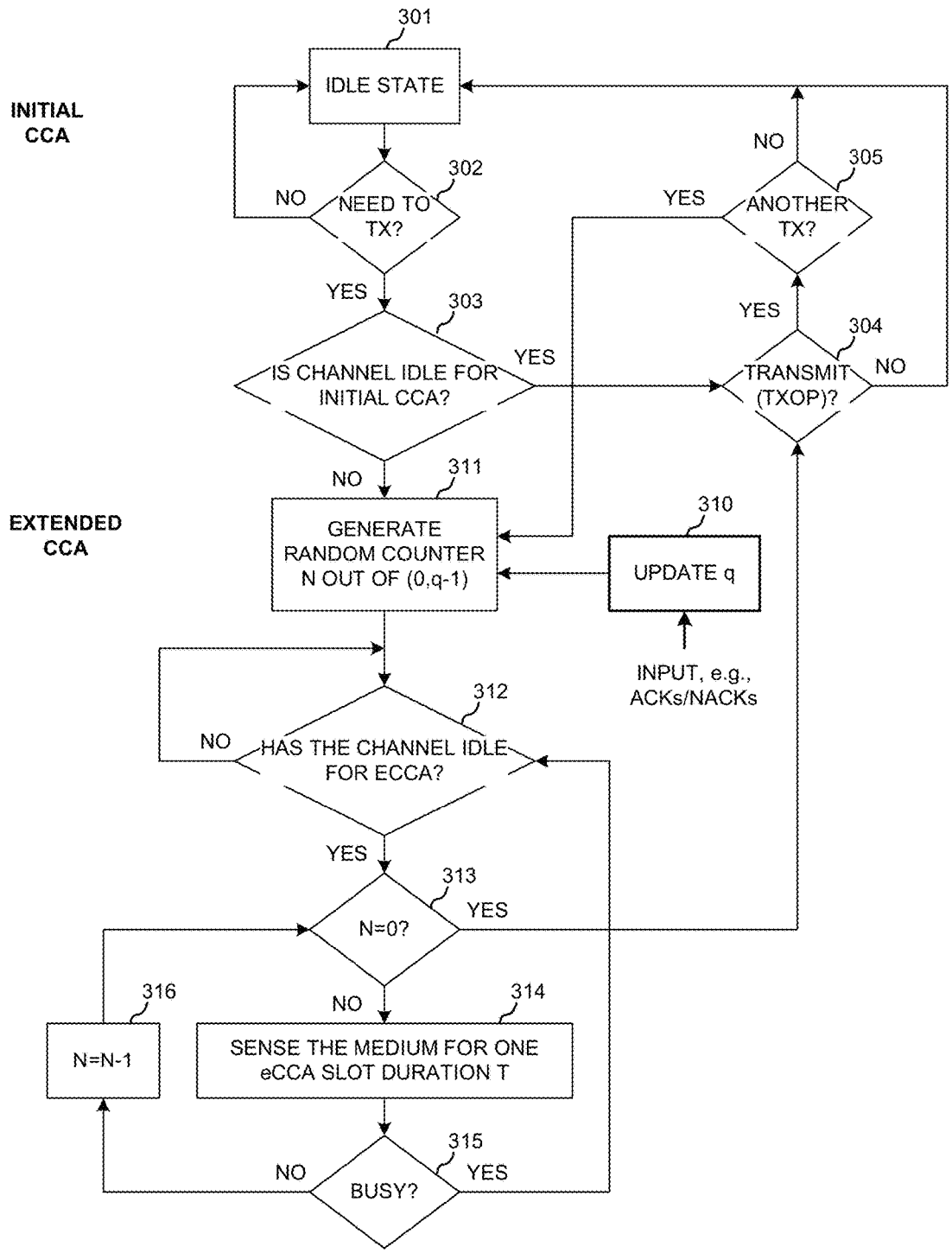
FIG. 3 illustrates a listen before talk (LBT) channel access mechanism based on initial CCA and extended CCA with distributed control in accordance with embodiments of the current invention.

FIG. 3 illustrates a Category 4 listen before talk (LBT) channel access mechanism based on initial clear channel assessment (initial CCA) and extended CCA. Based on the Category 4 LBT procedure, a transmitter is allowed to transmit radio signals onto the shared wireless medium depending on CCA sensing and a deferral or backoff procedure for channel access contention as long as the CCA indicates the channel is idle. The LBT procedure allows the transmitter to gain access to the shared wireless medium, e.g., to obtain a transmitting opportunity (TXOP) for transmitting radio signals onto the shared wireless medium. The basic assumption of LBT is that a packet collision can occur if a device transmits signal under the channel busy condition when the received signal level is higher than a CCA level, e.g., an energy detection (ED) threshold or a preamble detection (PD) threshold. Furthermore, LBT is a form of differentiated QoS. Traffic can be classified into four access categories (AC): AC_VI (for video), AC_VO (for voice), AC_BE (for best effort), and AC_BK (for background). Each device is expected to access the channel based on the AC-specific LBT parameters to which the traffic belongs.

In step 301, a wireless device (an eNB/UE) is in idle state. Note that, here, the idle state refers a behavior that the device does not trigger any transmission or reception operations. In step 302, the eNB/UE determines whether it needs to transmit. If no, it returns to idle state; if yes, it goes to step 303 and checks whether the wireless channel is idle for the initial CCA period (BiCCA, e.g., 34 us). If the answer is yes, then the eNB/UE transmits radio signals in step 304 and checks if it has obtained the transmit opportunity (TXOP). If the answer is no, then it goes back to idle state; if the answer is yes, then it goes to step 305 and determines whether it needs another transmission. If the answer is no, then it goes back to idle state.

If the answer to step 303 is no, or if the answer to step 305 is yes, then the eNB/UE goes to step 311 and enters the extended CCA procedure. In step 311, the eNB/UE generates a random backoff counter N out of the contention window size q (e.g., N is generated from 0 to q−1). In step 312, the eNB/UE checks whether the wireless channel has been idle for the extended CCA defer period (DeCCA, e.g., 34 us). If the answer is no, then it goes back to step 312; if the answer is yes, then it goes to step 313 and checks whether the random backoff counter N is equal to zero. If the answer is yes, then it goes to step 304 for transmission; if the answer is no, then it goes to step 314 and senses the wireless medium for one eCCA time slot duration T (e.g., T=9 us). In step 315, the eNB/UE checks whether the wireless channel is busy. If the answer is yes, then it goes back to step 312; if the answer is no, then it goes to step 816 and reduces the random backoff counter N by one (e.g., N=N−1), and then goes to step 313 to check whether counter N is equal to zero. Note that based on the ECCA procedure, when the channel is busy, the eNB/UE shall defer transmission until the wireless channel has been determined to be idle for an uninterrupted deferred period.

In the Category 4 LBT channel access mechanism of FIG. 3, several CCA/eCCA parameters such as the initial CCA period (BiCCA), the contention window size q, the eCCA defer period (DeCCA), and the eCCA slot duration (T) can be used to control how aggressively a node contends for channel access. The initial CCA period (BiCCA), the contention window size q, the eCCA defer period (DeCCA), the eCCA slot duration (T), CCA ED (energy detection) threshold, CCA PD (preamble detection) threshold, eCCA ED threshold, and eCCA PD threshold are all possible knobs to turn. The parameters for category 4 LBT procedure are {BiCCA, q, DeCCA, T, CCA threshold, eCCA threshold}. In addition, the smaller the initial CCA period/the contention window size/the eCCA defer period/the eCCA slot duration, and the higher the CCA ED (energy detection) threshold/ CCA PD (preamble detection) threshold/eCCA ED (energy detection) threshold/eCCA PD (preamble detection) threshold, a transmitting node contends for channel access more aggressively.

Figure 4:
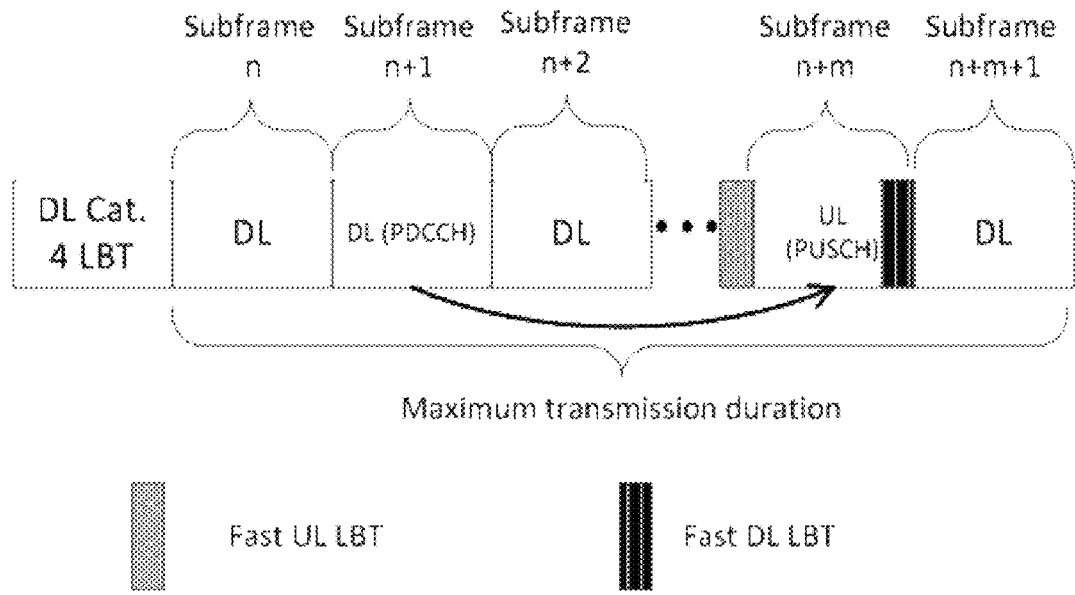
FIG. 4 illustrates a transmission sequence initiated with a downlink transmission.

FIG. 4 illustrates a transmission sequence initiated with a downlink transmission. After the first subframe in a transmission sequence, the LBT procedure for another transmission within the same transmission sequence should be fast (e.g., Category 2 LBT) as compared to the downlink Category 4 LBT. In FIG. 4, the transmission on the first subframe of the transmission sequence is for DL after performing the downlink Category 4 LBT, then a fast UL LBT such as a one shot CCA can be used in the switch from DL transmission to UL transmission. If there is another DL transmission coming after the UL transmission, a fast DL LBT such as a one shot CCA for the DL transmission can be used.

Figure 5:
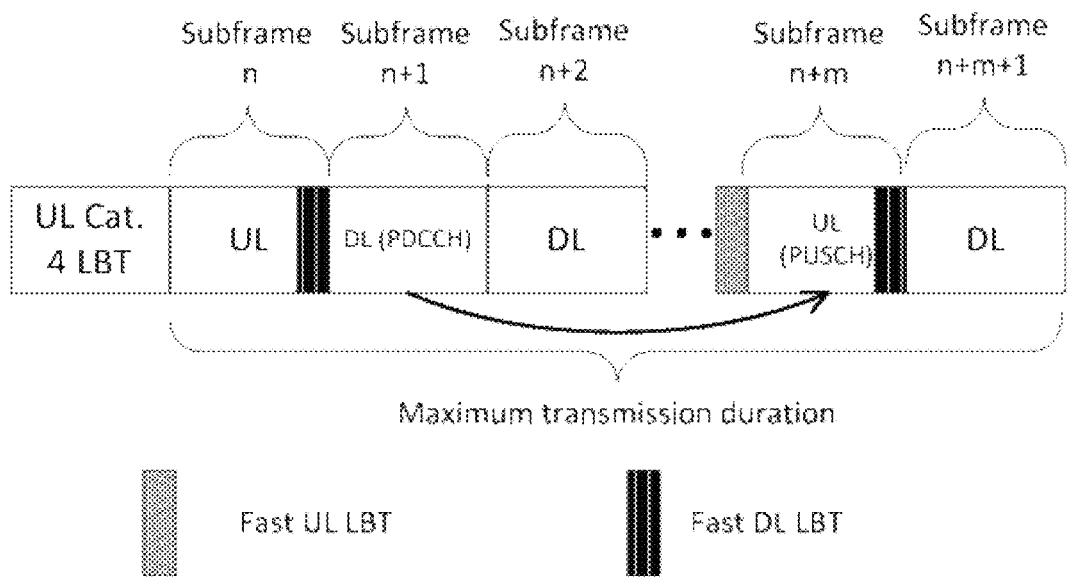
FIG. 5 illustrates a transmission sequence initiated with an uplink transmission.

FIG. 5 illustrates a transmission sequence initiated with an uplink transmission. After the first subframe in a transmission sequence, the LBT procedure for another transmission within the same transmission sequence should be fast (e.g., Category 2 LBT) as compared to the uplink Category 4 LBT. In FIG. 5, the transmission on the first subframe of the transmission sequence is for UL after performing the uplink Category 4 LBT, then a fast DL LBT such as a one shot CCA can be used in the switch from UL transmission to DL transmission. If there is another UL transmission coming after the DL transmission, a fast UL LBT such as a one shot CCA for the UL transmission can be used.

In the example of FIG. 5, eNB can give multiple UEs uplink grant at subframe n, and each of the UEs conducts a Category 4 LBT to hold the channel. If too many UEs are assigned to do so, then uplink channel access at subframe n can be rather aggressive. There may be a room to limit the number of UEs conducting Category 4 LBT simultaneously, so only a few UEs contending for uplink channel access. Also, the buffer status of those UEs can be taken into consideration in determining the maximum transmission duration in the case of the first subframe being for uplink transmission.

It is noted that a Category 4 LBT is performed to gain a channel autonomously by UE. On the other hand, a short LBT such as one shot CCA is performed on an already held channel over a subframe within the maximum transmission duration. Under some conditions, a Category 4 LBT can be converted into a short LBT.

Figure 6:
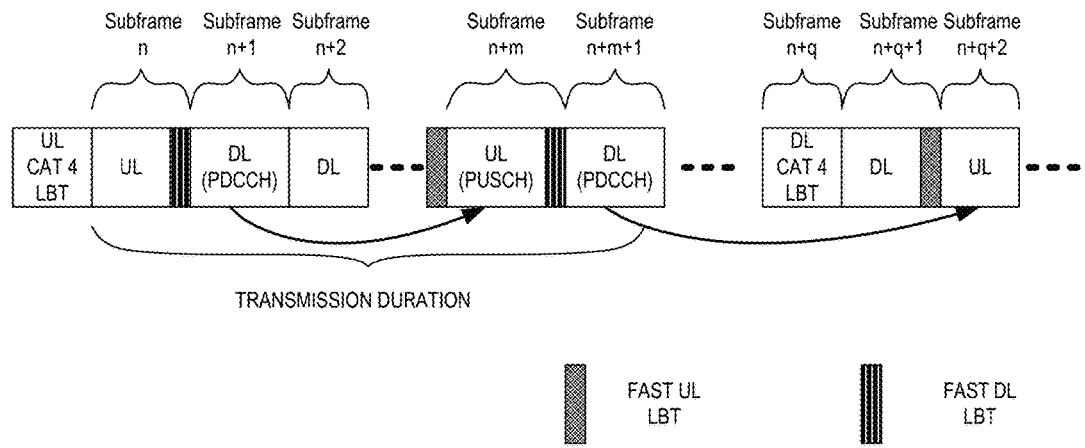
FIG. 6 illustrates one embodiment of conversion of LBT in accordance with one novel aspect.

FIG. 6 illustrates one embodiment of conversion of LBT in accordance with one novel aspect. In the example of FIG. 6, when a UE is scheduled in subframe n+m+1 to transmit in subframe n+q+2, as subframe n+q+2 cannot be covered by the MCOT starting from subframe n, subframe n+q+2 does not belong to the same transmission sequence starting from subframe n. As a result, the UE is expected to perform a Category 4 LBT before subframe n+q+2. However, since the eNB is successful in holding the channel from subframe n+q+1, performing the Category 4 LBT becomes unnecessary. Therefore, the UE just performs a fast UL LBT before subframe n+q+2. In another word, a Category 4 LBT is converted into a fast LBT (e.g., one shot CCA). Note that conversion needs to be facilitated through a downlink signaling or detection on the UE side on the CRS signal in subframe n+q+1. The downlink signaling can be sent from the same carrier or a different carrier as for the scheduled uplink transmission.

Figure 7:
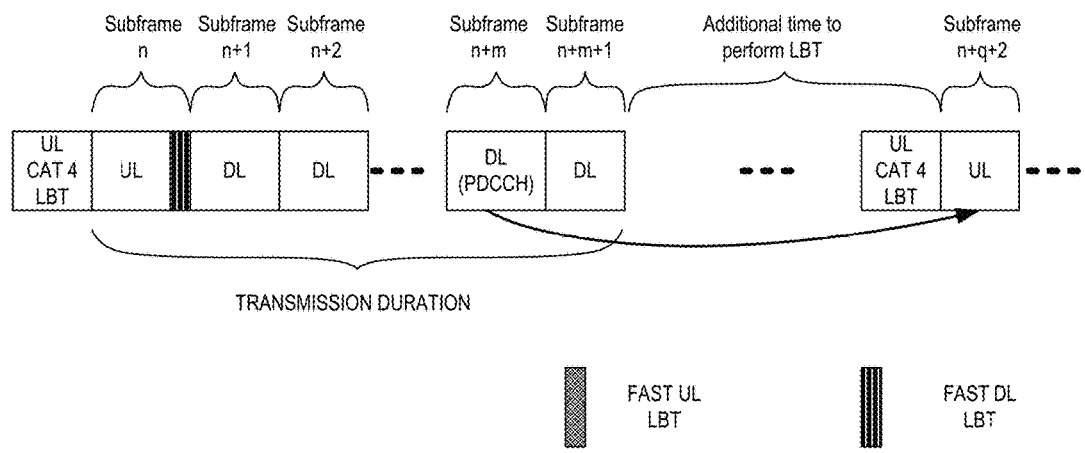
FIG. 7 illustrates one embodiment of signaling the remaining duration in a transmission sequence.

FIG. 7 illustrates one embodiment of signaling the remaining duration in a transmission sequence. In the example of FIG. 7, as eNB has the intention to hold the channel until subframe n+m+1, the start time for Category 4 LBT should be after the end of a transmission sequence. It can be seen that the remaining duration of the transmission sequence thus needs to be indicated in PDCCH. As a result, the UE scheduled for uplink transmission knows when the current transmission sequence ends and the to start a Category 4 LBT. For example, when a UE is scheduled in subframe n+m to transmit in subframe n+q+2, the uplink grant in PDCCH should indicate the remaining duration of the transmission sequence.

Further, for the uplink grant sent in subframe n+m, the grant in PDCCH should include the LBT parameters for a Category 4 LBT. Depending on whether an eNB can schedule UEs with LBTs at different priority classes at the same subframe, the eNB can signal the LBT parameters such as the contention window size or backoff counter value to a UE. The signaling can be indicated through several ways. First, the LBT parameter is signaled as part of the dedicated uplink grant message, e.g., through adding a new field in DCI format 0 and 4, introducing a field for the LBT parameter in a new DCI format for LAA uplink grant. Second, the LBT parameter can be signaled in a common message, e.g., by adding a new field in the common PDCCH format for LAA. For example, four bits are used to indicate the subframe structure of the current subframe or next subframe, there are reserved bits can be converted to carry the LBT parameter.

Figure 8:
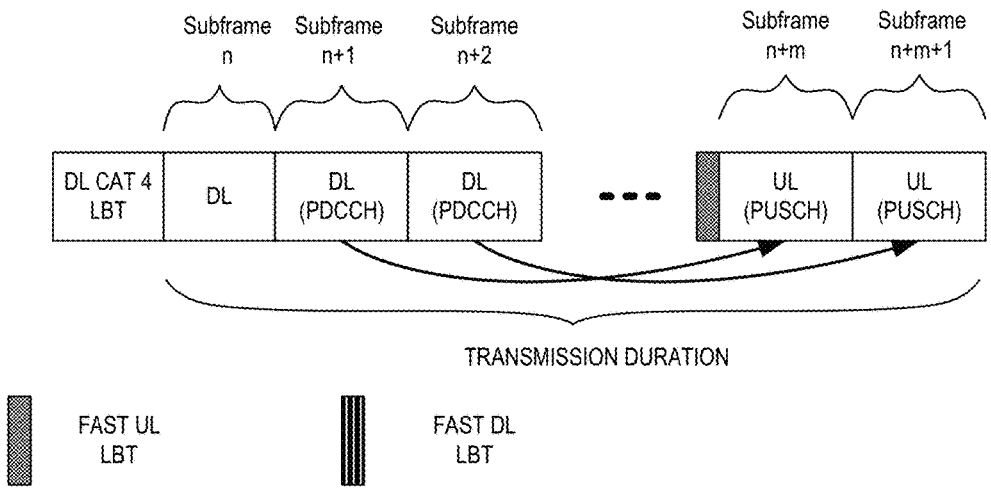
FIG. 8 illustrates one embodiment of uplink transmission under consecutive scheduling.

FIG. 8 illustrates one embodiment of uplink transmission under consecutive scheduling. When a UE is granted uplink transmission in consecutive subframes and when all of them are within the maximum transmission duration shown in FIG. 8, it is enough for the UE to perform LBT on the first UL subframe (Subframe n+m), and forgo LBTs on the rest of them.

Figure 9:
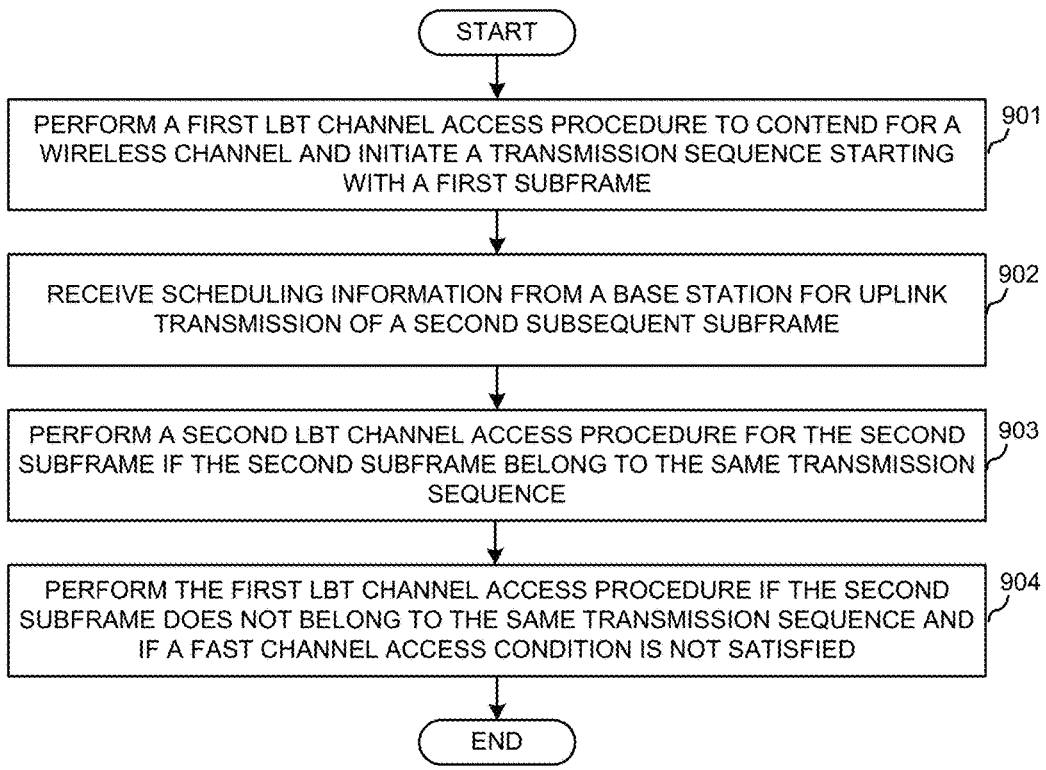
FIG. 9 is a flow chart of a method of channel access procedure involving uplink LBT in accordance with one novel aspect.

FIG. 9 is a flow chart of a method of channel access procedure involving uplink LBT in accordance with one novel aspect. In step 901, a wireless device performs a first listen-before-talk (LBT) channel access procedure to contend for a wireless channel and initiate a transmission sequence starting with a first subframe. In step 902, the wireless device receives scheduling information from a base station for uplink transmission of a second subsequent subframe. In step 903, the wireless device performs a second LBT channel access procedure for the second subframe if the second subframe belongs to the same transmission sequence. In step 904, the wireless device performs a first LBT channel access procedure if the second subframe does not belong to the same transmission sequence and if a fast channel access condition is not satisfied.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
 performing a first listen-before-talk (LBT) channel access procedure having a first LBT time by a wireless device to contend for a wireless channel and to initiate a transmission sequence starting with a first subframe;
 receiving scheduling information from a base station for uplink transmission of a second subsequent subframe;
 performing a second fast LBT channel access procedure having a second LBT time for the second subframe when the second subframe belongs to the same transmission sequence, wherein the second fast LBT channel access procedure is faster as compared to the first LBT channel access procedure such that the second LBT time is no longer than the first LBT time; and
 performing the first LBT channel access procedure for the second subframe when the second subframe does not belong to the same transmission sequence.

2. The method of claim 1, wherein the first LBT channel access procedure involves an initial clear channel assessment (CCA) sensing and an extended CCA sensing.

3. The method of claim 1, wherein the second fast LBT channel access procedure involves a one-shot clear channel assessment (CCA) sensing.

4. The method of claim 1, wherein the transmission sequence comprises a number of subframes within a maximum channel occupancy time (MCOT).

5. The method of claim 1, wherein the scheduling information comprises information on remaining duration of the transmission sequence.

6. The method of claim 1, wherein the scheduling information comprises LBT parameters including a contention window size and a backoff counter value.

7. The method of claim 1, wherein the wireless device converts the first LBT channel access procedure to the second fast LBT channel access procedure when a fast LBT channel access condition is satisfied.

8. A wireless device, comprising:
- a channel access handling circuit that performs a first listen-before-talk (LBT) channel access procedure having a first LBT time to contend for a wireless channel and initiate a transmission sequence starting with a first subframe;
- a receiver that receives scheduling information from a base station for uplink transmission of a second subsequent subframe; and
- the channel access handling circuit that performs a second fast LBT channel access procedure having a second LBT time for the second subframe when the second subframe belongs to the same transmission sequence, wherein the second fast LBT channel access procedure is faster as compared to the first LBT channel access procedure such that the second LBT time is no longer than the first LBT time, and wherein the wireless device performs the first LBT channel access procedure for the second subframe when the second subframe does not belong to the same transmission sequence.

9. The wireless device of claim 8, wherein the first LBT channel access procedure involves an initial clear channel assessment (CCA) sensing and an extended CCA sensing.

10. The wireless device of claim 8, wherein the second fast LBT channel access procedure involves a one-shot clear channel assessment (CCA) sensing.

11. The wireless device of claim 8, wherein the transmission sequence comprises a number of subframes within a maximum channel occupancy time (MCOT).

12. The wireless device of claim 8, wherein the scheduling information comprises information on remaining duration of the transmission sequence.

13. The wireless device of claim 8, wherein the scheduling information comprises LBT parameters including a contention window size and a backoff counter value.

14. The wireless device of claim 8, wherein the wireless device converts the first LBT channel access procedure to the second fast LBT channel access procedure when a fast LBT channel access condition is satisfied.

* * * * *